United States Patent
Timtner et al.

[15] 3,681,939
[45] Aug. 8, 1972

[54] ELASTIC SHAFT COUPLING WITH METALLIC ELEMENTS

[72] Inventors: Karlheinz Timtner, Hofheimer Strasse 34; Albrecht Maurer, Hoelderlinweg 18; Ruprecht Maurer, Theodor-Storm-Strasse 20, all of Bad Homburg, Germany

[22] Filed: March 5, 1971

[21] Appl. No.: 121,509

[30] Foreign Application Priority Data

March 7, 1970 Germany..........P 20 10 957.3

[52] U.S. Cl. ..................................................64/27 L
[51] Int. Cl..................................................F16d 3/19
[58] Field of Search....................................64/27, 15

[56] References Cited

UNITED STATES PATENTS

| | | | |
|---|---|---|---|
| 1,698,309 | 1/1929 | Lewis | 64/27 L |
| 2,106,823 | 2/1938 | Alben | 64/27 L |
| 3,336,765 | 8/1967 | Fawick | 64/15 R |

Primary Examiner—Edward G. Favors
Attorney—Webb, Burden, Robinson & Webb

[57] ABSTRACT

The invention relates to an elastic shaft coupling with elastic metallic elements disposed between the driving cams of the coupling members.

12 Claims, 11 Drawing Figures

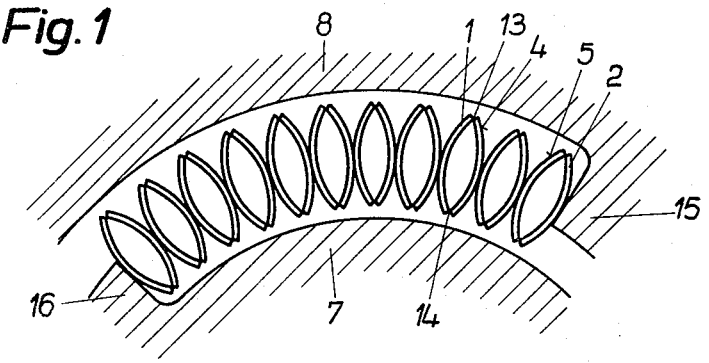
Fig. 1
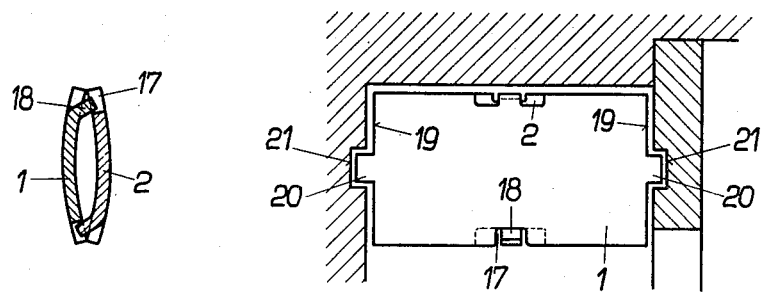
Fig. 6
Fig. 7
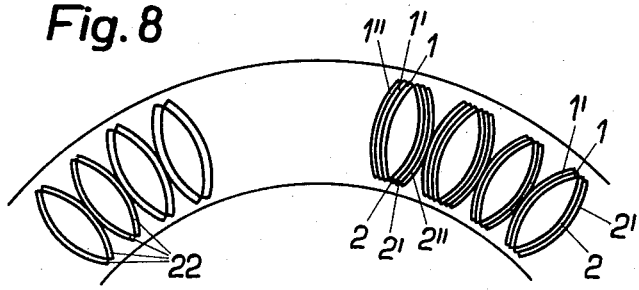
Fig. 8

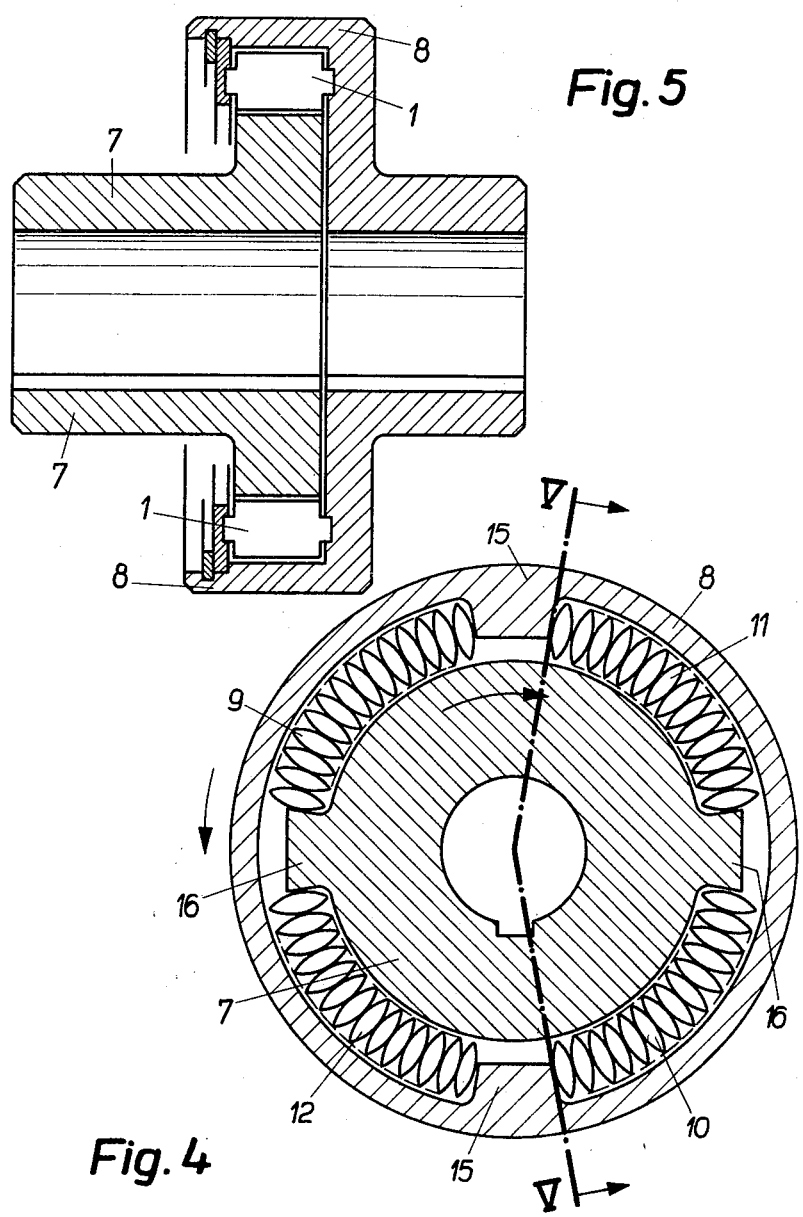

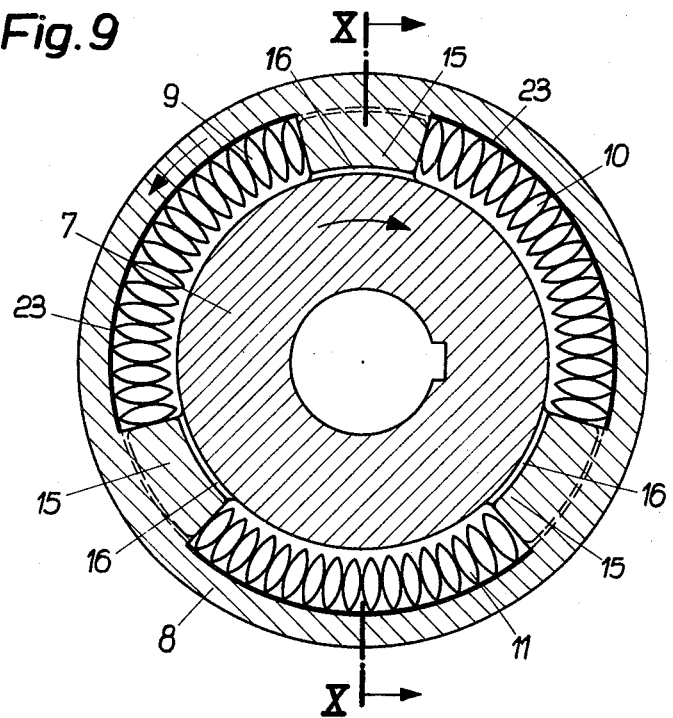
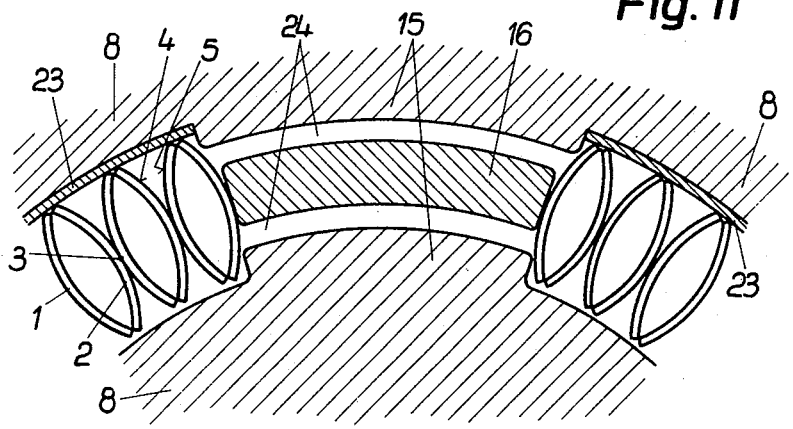

ELASTIC SHAFT COUPLING WITH METALLIC ELEMENTS

Shaft couplings of the type mentioned above which are elastically rotatable and movable all around have been known in many embodiments. Particularly advantageous are those elastically rotatable shaft couplings that have a progressive characteristic curve, i.e., the torque transmitted from the coupling increases more than proportionally as the angle of rotation of the two members of the coupling increases. This property proves to be of particular advantage if torsional vibrations are to be feared in the shafts that are to be coupled when the mass is resting upon them. The rotationally elastic shaft couplings that act progressively prevent the occurrence of resonance phenomena with their undesirable consequences.

When resonance phenomena are prevented by the proper selection of the characteristic curve of the spring, additional damping of torsional vibration becomes unnecessary. In this way the disadvantageous consequences of damping, namely, the heating up of the shaft coupling, and— in the case of rubber members—the aging caused thereby, or—in the case of frictional dampers—the wear on the damping members, are reduced.

It is also advantageous to have rotationally elastic shaft couplings permit large angles of torque between the two parts of the shaft. The softer the shaft coupling is, the less will any irregularities in the drive movement be transmitted to the drive, and vice versa.

It is a further requirement that rotationally elastic shaft couplings exert the least possible compulsive forces on the shafts that are to be coupled when the shafts are offset relative to one another (angularly, axially and radially). The weaker these forces, the less will be the heating up and the wear in the adjacent shaft bearings.

It is the object of the invention to fulfill these technical requirements in a particularly advantageous manner, to make the installation of additional springs unnecessary for achieving a progressive characteristic curve, and to create a coupling that combines the following properties while keeping manufacturing costs down:

1. A strong progressive curve of the torque as a function of the angle of torque of the coupling halves relative to one another in order to achieve freedom from resonance vibrations in critical ranges of speed.
2. Large permissible torque angles in order to bridge over marked degrees of irregularities.
3. Dispensability of heat-generating damping devices.
4. Minimal forces of reaction when the shafts that are to be coupled are offset radially, axially or angularly to one another, in order to keep the additional forces on the shaft bearings low.
5. Insensitivity to rather high ambient temperatures.
6. The use of non-aging spring materials.

The invention accomplishes these aims by having the elastic members consist of basically square, cylindrically curved leaf springs whose axis of curvature is parallel to the axis of the shaft coupling; these leaf springs have their convex surfaces and their edges which run parallel to the axis of the shaft coupling placed against one another alternately, the leaf springs abutting against one another on almost their entire surfaces when they are pressed flat and uniformly experience the maximum permissible bending stress on their cylindrical surfaces.

The height of camber of the cylindrically curved leaf springs is about one-fifth of the length of the leaf spring as measured in the direction of the circumference of the cylinder.

In each intervening space between the driving cams of the coupling members a plurality of leaf springs is housed in packages of leaf springs.

Viewed in the direction of the periphery, the driving cams are alternately connected to the one member of the coupling and to the other member of the coupling and the leaf spring packages disposed between the driving cams are prestressed by at least one half of their spring deflection.

Expediently in each leaf spring package one or more sets of thin leaf springs is installed which is prestressed in the non-loaded state of the coupling, and is relieved in those leaf spring packages which are unstressed when the coupling is stressed, so that the active thicker sets of leaf springs are prevented from falling over.

A set of leaf springs consisting of at least two oppositely curved leaf springs may also contain additional oppositely curved leaf springs.

Due to a special configuration of the driving cams of the members of the coupling it is, however, possible over and beyond this to have all the leaf springs of all the leaf spring packages cooperate simultaneously in the transmission of a torque regardless of the direction of rotation. For this it is always necessary for the leaf springs to be disposed between two driving cams of the one coupling member and simultaneously between two driving cams of the other coupling member, the driving cams being so designed that they run past one another without touching one another.

Advantageously, the driving cam of the one coupling member is divided in a fork-like manner and the associated driving cam of the other coupling member moves without contact through the free space formed by the fork.

Preferably the stop faces of the driving cams abutting against the leaf springs are so designed as to conform to the outline of the said leaf springs.

It is also advisable to protect the surfaces of the coupling members which come in contact with the leaf spring by a wear plate—more particularly, by an insert of tempered sheet steel.

Further details and explanations will become more apparent from the following description with reference to the drawings.

FIG. 1 shows a partial cross-section through the two coupling members.

FIG. 4 is a cross-section through the coupling.

FIG. 5 is a longitudinal section through the coupling taken along line V—V of FIG. 4.

FIG. 6 shows a cross-section of a set of leaf springs.

FIG. 7 is a plan view of a set of leaf springs.

FIG. 8 is a schematic side elevation of a combination of thicker and thinner sets of leaf springs, as well as a combination of sets of leaf springs that are bundled into larger units.

FIG. 9 shows a cross-section through a modified coupling and is taken along line I—I of FIG. 10.

FIG. 11 is a partial cross-section on an enlarged scale through a special embodiment of the coupling of FIG. 9.

The basic elements of the proposed coupling are the leaf springs 1 and 2 shown in the various figures of the drawings. They are basically square in shape and cylindrically curved, and their progressive rotational elasticity is produced by compressing them. Compared to the length measured in the direction of the circumference of the cylinder, the leaf springs have a small height of camber. The leaf springs abut against one another alternately with their convex surfaces 4 and 5 and with their edges 13 and 14 which run parallel to the axis of the shaft coupling.

Figure 2:
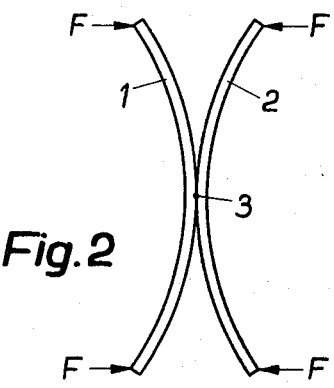
FIGS. 2 and 3 show a set of leaf springs schematically in the unstressed state and in the stressed state, respectively.
Figure 3:
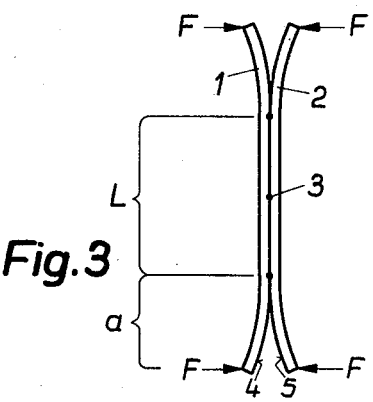

When such leaf springs are stressed, as shown in FIGS. 2 and 3, moments of flexure arise in leaf springs 1 and 2 which are greatest in the center 3 of the leaf spring where the springs touch one another on convex surfaces 4 and 5. The spring deflection is at first proportional to the stress until leaf springs 1 and 2 have been pressed flat on their line of contact in the center 3 of the leaf spring. When the stress is increased further, the two leaf springs 1 and 2 abut against one another starting out from leaf spring center 3, the size of the contact area L increasing thereby. In so doing the effective lever arm a of the leaf springs grows even smaller, so that in order to press the springs together still further, the stress F must grow more than proportionally. This produces a very progressive characteristic curve for the spring.

The radius of curvature of the unstressed leaf spring is advantageously so selected that when the spring is pressed flat, the maximum permissible flexural stress will prevail in the leaf springs.

A number of the thusly abutting pairs of leaf springs are disposed as prestressed packages of leaf springs in the shaft coupling between driving cams 15 and 16 of shaft coupling members 7 and 8. There are a number of such leaf spring packages between the driving cams of a coupling. By way of example, FIG. 4 shows four leaf spring packages 9, 10, 11 and 12. The pretension of the leaf spring packages advantageously comprises at least one half of the total spring deflection. The above explained progressivity of the characteristic curve of the spring for an individual pair of leaf springs also applies to the shaft coupling as a whole. If in accordance with FIG. 4 inner shaft coupling member 7 is twisted in the direction of the arrow relative to outer shaft coupling member 8, spring packages 9 and 10 will become increasingly subjected to pressure, while leaf spring packages 11 and 12 will be increasingly relieved. At first the twisting of the two members of the shaft coupling relative to one another is proportional to the torque. As soon as there is an enlargement in the area of contact in leaf spring packages 9 and 10 in accordance with FIG. 3, the torque will increase more than proportionally as the torsion of the two coupling members 7 and 8 relative to one another increases.

Since many leaf springs may be stacked on one another in a single leaf spring package, very large angles of torque are possible between the shaft coupling members before the maximum permissible moment of torque has been reached. This stacking represents a series arrangement of the individual leaf springs. Additional equidirectional pairs 1', 2' 1", 2" of leaf springs may be added to a pair 1, 2 of leaf springs.

Moreover, each leaf spring package may contain several thinner sets 22 of leaf springs which serve to prevent the thicker sets of leaf springs from falling over when the leaf spring packages are relieved. The configuration of the leaf springs shown in FIGS. 7 and 8 can also serve for better guidance of the leaf spring packages. The individual leaf springs are provided with projecting noses 18 and 20 which are engaged in recesses 17 of the leaf springs and in grooves 21 of the coupling members, respectively.

When the shafts that are to be coupled are misaligned, driving cams 15 and 16 belonging to coupling members 8 and 7, respectively, and disposed between the leaf spring packages can readily be shifted. In an axial direction, only those frictional forces act on them which stem from the peripheral forces in the leaf spring packages. In a radial direction, at the most the difference between the compressive forces in leaf spring packages 9 and 10 which is produced in the displacement of the shaft coupling members will have any effect.

Figure 10:
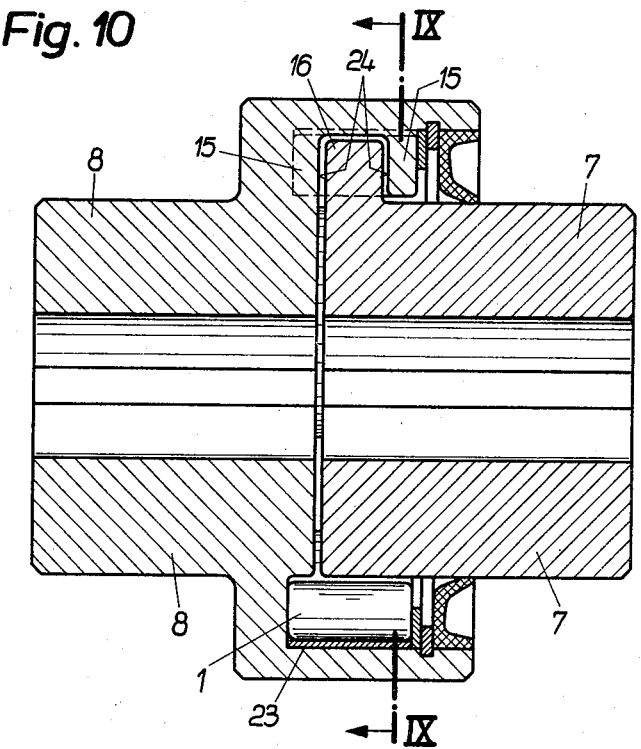
FIG. 10 is a longitudinal section through the coupling of FIG. 9 and is taken along line II—II of FIG. 9.

In the modifications shown in FIGS. 9 to 11, on the other hand, special means for mutually bracing the leaf springs and for guiding them in the coupling can be dispensed with, since here there are no leaf spring packages which might become relieved and not participate in the transmission of the torque. This is accomplished by the special configuration of the driving cams 15 of coupling member 8 and of driving cams 16 of coupling member 7. They are so shaped that they can move past one another without hindering one another. Advantageously, the one driving cam is designed in a forked manner so that the other driving cam can move through the free space 24 formed by the forked design without any contact.

The embodiment shown in FIG. 11 differs from the embodiment of FIGS. 9 and 10 in the design of driving cams 15 and 16. In the embodiment of FIGS. 9 and 10 the driving cams 16 protrude radially into the intervening space between divided cam 15. In the embodiment of FIG. 11 driving cams 16 extend in an axial direction into the hollow cylindrical free space 24 between the divided driving cams 15.

In the last two instances mentioned, as the result of the special configuration of the driving cams, all of the leaf springs are acted upon simultaneously when a moment of torque is transmitted, so that the leaf springs need no longer be prestressed when installed, and this represents a substantial facilitation of labor. Moreover, the special recesses 17 and noses 18 engaging therein for the purpose of bracing the leaf springs against one another may also be dispensed with, since there are no longer any leaf springs that become relieved and work loose. Naturally, noses 20 and grooves 21 are now also dispensable, and, therefore, smooth-edged leaf springs may be used which are simple to manufacture.

The coupling member surfaces which come in contact with the leaf springs are suitably lined with a wear plate 23.

The advantages of the invention reside in the fact that with the use of simple, easily and economically manufactured parts it is possible to build an elastic coupling which is free of resonance phenomena due to a strongly progressive characteristic curve of the spring, and which simultaneously permits large elastic angles of torque without exerting harmful forces of reaction on the adjacent shaft bearings when the shafts are misaligned. By using metallic spring elements the coupling is not subjected to aging and is insensitive to rather high temperatures and to oils and grease. The coupling may be built very small due to the high utilization of the volume of the springs.

Having thus described the invention with the detail and particularity as required by the Patent Laws, what is desired protected by Letters Patent is set forth in the following claims.

We claim:

1. An elastic shaft coupling having elastic metallic elements disposed between the driving cams of the coupling members, characterized by the fact that the elastic elements consist of basically square, cylindrically curved leaf springs (1, 2) whose axis of curvature runs parallel to the axis of the shaft coupling, the said leaf springs alternately abutting against one another with their convex surfaces (4,5) and their edges (13,14) which run parallel to the axis of the shaft coupling, the leaf springs, when pressed flat, abutting against one another along almost their entire surface and experiencing the maximum permissible bending stress on the cylindrical surfaces.

2. A shaft coupling according to claim 1 characterized by the fact that the height of camber of the cylindrically curved leaf spring comprises up to one-fifth of the length of the leaf spring measured in the direction of the circumference of the cylinder.

3. A shaft coupling according to claim 1 characterized by the fact that in each intervening space between the driving cams (15, 16) of the coupling members (7,8) a plurality of leaf springs is combined into leaf spring packages (9, 10, 11, 12).

4. A shaft coupling according to claim 3 characterized by the fact that viewed in the direction of the circumference the driving cams are connected alternately with the one member of the coupling and with the other member of the coupling, and that the packages of leaf springs disposed between the driving cams are prestressed by at least one half of their total spring deflection.

5. A shaft coupling according to claim 1 characterized by the fact that on one of the edges which runs parallel to the axis of the shaft coupling the leaf springs are provided with recesses (17) and on the other edge toward the concave side are provided with crimped noses (18) which engage the recesses when the leaf springs are combined into packages of leaf springs.

6. A shaft coupling according to claim 1 characterized by the fact that on their edges (19) which are at right angles to the axis of the shaft coupling the leaf springs are provided with noses (20) which are guided in suitably shaped grooves (21) in one of the two coupling members.

7. A shaft coupling according to claim 4 characterized by the fact that in each package of leaf springs one or more sets of thinner leaf springs (22) is installed which is prestressed in the unloaded state of the coupling and which is relieved in those packages of leaf springs which are relieved when the coupling is acted upon, so that the active, thicker sets (1,2) of leaf springs will be prevented from falling over.

8. A shaft coupling according to claim 1 characterized by the fact that a set of leaf springs which consists of at least two leaf springs (1,2) which curve in opposite directions also contains additional pairs (1', 2', 1'', 2'') of leaf springs which curve in opposite directions.

9. A shaft coupling according to claim 1 characterized by the fact that the elastic leaf springs (1,2) are always disposed between two driving cams (15,15) of the one coupling member (8) and simultaneously between two driving cams (16,16) of the other coupling member (7), the driving cams (15,16) being so designed that they run past one another without touching one another.

10. A shaft coupling according to claim 9 characterized by the fact that the driving cam of the one coupling member is divided in forked manner and that the associated driving cam of the other coupling member moves without making contact through the free space formed by the forked construction.

11. A shaft coupling according to claim 9 characterized by the fact that the stop faces of the driving cams which abut against the elastic leaf springs are shaped to conform to the outline of the said leaf springs.

12. A shaft coupling according to claim 9 characterized by the fact that the coupling member surfaces which come in contact with the elastic leaf springs are protected by a wear plate (23)—more particularly, by an insert of tempered sheet steel.

* * * * *

UNITED STATES PATENT OFFICE
CERTIFICATE OF CORRECTION

Patent No. 3,681,939     Dated   August 8, 1972

Inventor(s)   Karlheinz Timtner, Albrecht Maurer and Ruprecht Maurer

It is certified that error appears in the above-identified patent and that said Letters Patent are hereby corrected as shown below:

Between the listing of the inventors and the filing date insert the following --Assignee: Firma Ringspann Albrecht Maurer KG. --.

Signed and sealed this 2nd day of January 1973.

(SEAL)
Attest:

EDWARD M. FLETCHER, JR.
Attesting Officer

ROBERT GOTTSCHALK
Commissioner of Patents